United States Patent [19]

Johnstone et al.

[11] Patent Number: 4,776,514

[45] Date of Patent: Oct. 11, 1988

[54] TWO WIRE LINE VOLTAGE THERMOSTAT

[75] Inventors: Robert V. Johnstone, Pickering; Brian E. McDonnell, Toronto, both of Canada

[73] Assignee: Honeywell Ltd., Canada

[21] Appl. No.: 82,759

[22] Filed: Aug. 7, 1987

[30] Foreign Application Priority Data

Nov. 17, 1986 [CA] Canada ................................... 523068

[51] Int. Cl.$^4$ ............................................. H05B 1/02
[52] U.S. Cl. .................................... 236/78 R; 165/26; 219/510; 236/46 R
[58] Field of Search ............. 165/26; 236/46 R, 78 R; 307/310; 219/510, 514; 361/154, 155

[56] References Cited

U.S. PATENT DOCUMENTS

| | | | |
|---|---|---|---|
| 2,958,008 | 10/1960 | Bray et al. | 236/78 X |
| 4,333,605 | 6/1982 | Peters | 236/46 R X |
| 4,365,167 | 12/1982 | Weimer et al. | 236/46 R X |

FOREIGN PATENT DOCUMENTS 2506969 12/1982 France ................................ 236/78 R Primary Examiner—William E. Wayner
Attorney, Agent, or Firm—Mitchell J. Halista; Albin Medved

[57] ABSTRACT

A two wire line voltage thermostat has first and second terminals for receiving line voltage power and for connection to a load, a transformer having a current primary winding, a voltage primary winding and a secondary winding, a primary controller connecting the current and voltage primary windings to the terminals, the controller having at least first and second states, the controller in the first state energizing both the current and voltage primary windings and in the second state energizing only the current primary winding, and a temperature responsive circuit connected to the secondary winding for controlling the controller between the first and second states in accordance with sensed temperature such that the load can be energized when the controller is in one of the states and can be deenergized when the controller is in the other of the states.

14 Claims, 1 Drawing Sheet

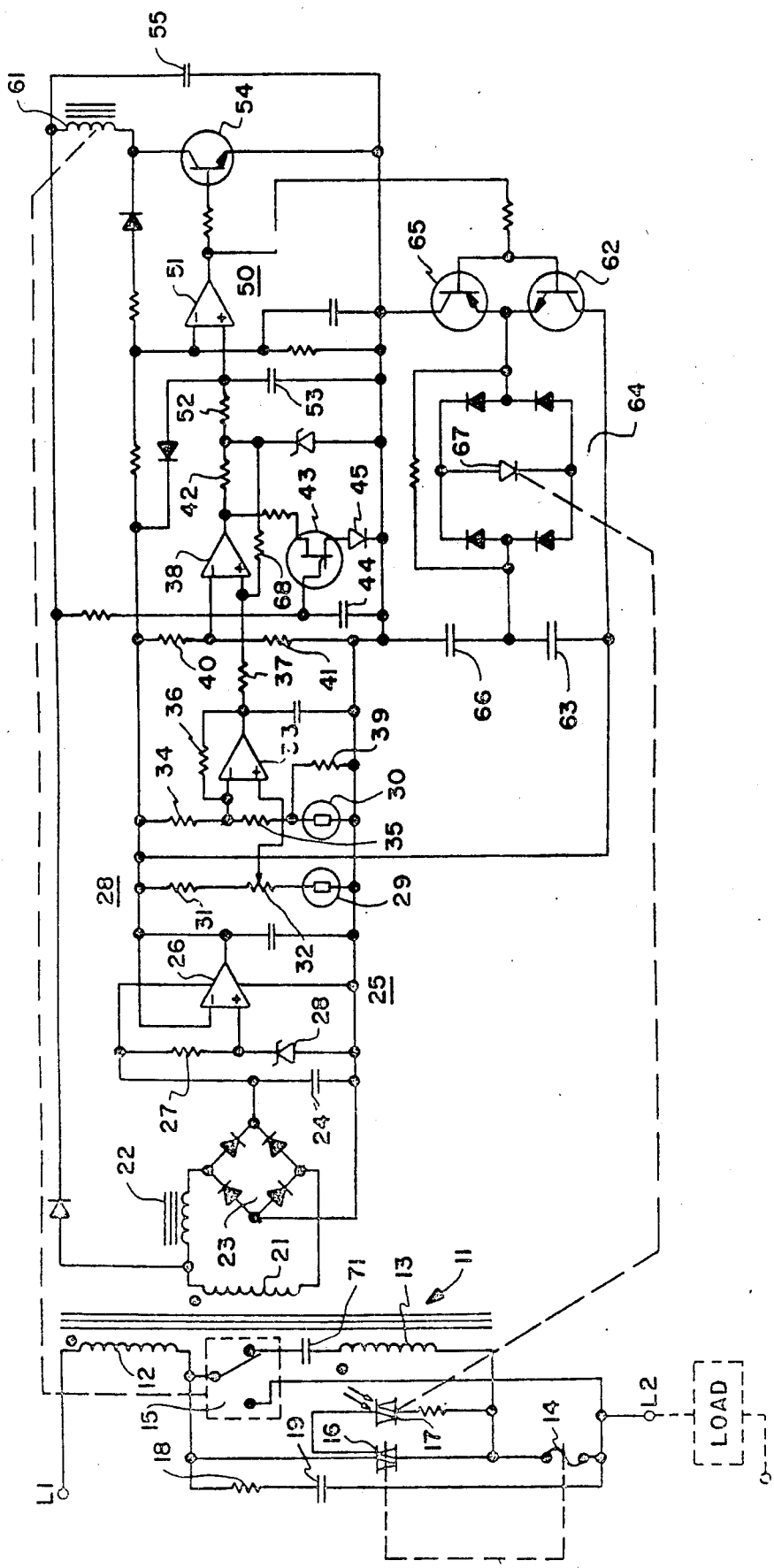

TWO WIRE LINE VOLTAGE THERMOSTAT

BACKGROUND OF THE INVENTION

1. Field of the Invention

The present invention relates to two wire line voltage thermostats and, more particularly, to such thermostats which are minimally affected by self generated heat and which provide power to the temperature responsive circuitry both during "off" periods and "on" periods of the thermostats.

2. Description of the Prior Art

Most electrical thermostats currently in use are low voltage thermostats. Low voltage thermostats, however, are costly to install because the low voltage outputs which they ssupply are insufficient to operate heat generating appliances. Thus, a contactor/relay is also included in the thermostat system for responding to the low voltage signal from the thermostat to switch line voltage to the heat generating appliance whereby the low voltage thermostat must be installed in two parts. One is the thermostat which is typically mounted on a wall of a living space within a residence, and the other is the contactor/relay which is typically installed on the heat generating appliance such as a furnace located in a basement of the residence.

Line voltage thermostats, on the other hand, reduce the complexity of installation normally associated with low voltage thermostats because line voltage thermostats do not require the contactor/relay. That is, line voltage thermostats can switch line voltage directly and, accordingly, can directly control the heat generating appliance. When line voltage thermostats are satisfied, that is when an ambient temperature sensed by the line voltage thermostat is at a setpoint temperature, the line voltage thermostat is open, and power is not supplied to the heat generating appliance. When the ambient temperature falls below the setpoint temperature, however, the thermostat closes, i.e., the thermostat's load controlling contacts are shorted, to supply power to the heat generating appliance. If the line voltage thermostat is an electronic thermostat, the closing of the load controlling contacts will bypass the electronics unless the thermostat is otherwise arranged to provide power during "on" periods of such thermostats.

Such arrangements can include running extra wires for powering the thermostat when the load is energized; this approach, however, involves extra installation complexity. Another arrangement is the use of a sizable capacitor to store energy during "off" times of the thermostats to be used by the electronics of the thermostat during the "on" periods of the thermostat. This arrangement, however, increases the cost of the thermostat itself and can create problems when the "on" periods of the thermostat far exceed the "off" periods in terms of length of time. Line voltage thermostats have also historically generated heat which has impaired the operation of the thermostat. Low voltage thermostats are, of course, subject to the same power considerations when such thermostats contain electronics which must be powered during "on" periods. Low voltage thermostats, in addition to using either extra wires for supplying power during "on" periods of the thermostat or a storage capacitor for storing power during "off" periods of the thermostat to be used during "on" periods, have alternatively used various power stealing arrangements. A power stealing arrangement is one which steals, during "on" periods of the thermostat, an amount of power insufficient to impair the functioning of the heat generating appliance but sufficient to power the electronics of the thermostat during such "on" periods.

SUMMARY OF THE INVENTION

An object of the present invention is to provide an improved line voltage thermostat for overcoming the problems of the prior art thermostats.

In accomplishing this and other objects, there has been provided, in accordance with the present invention, a two wire line voltage thermostat having first and second terminals for receiving line voltage power and for connection to a load, a transformer having a current primary winding, a voltage primary winding and a secondary winding, a primary controller for connecting the current and voltage primary windings to the terminals, the controller having at least first and second states, the controller in the first state energizing both the current and voltage primary windings and in the second state energizing only the current primary winding, and a temperature responsive apparatus connected to the secondary winding for controlling the controller between the first and second states in accordance with sensed temperature such that the load can be energized when the controller is in one of the states and can be deenergized when the controller is in the other of its states.

BRIEF DESCRIPTION OF THE DRAWINGS

A better understanding of the present invention may be had from the following detailed consideration of the invention when read in conjunction with the single FIGURE drawing which shows a circuit schematic of the preferred embodiment of the present invention.

DETALED DESCRIPTION OF THE PREFERRED EMBODIMENT

In the drawing, terminals L1 and L2 are the two terminals of a two wire line voltage thermostat embodying the present invention. Terminal L1 is connected to one terminal of a power source and the other terminal of the power source is connected to terminal L2 through the load, which can be a heat generating load, such as a resistive baseboard heater. Transformer 11 is connected between terminals L1 and L2 and includes current primary winding 12 and voltage primary winding 13. Fuse 14 is included in the circuit between voltage primary winding 13 and terminal L2 for providing thermal cut-off of the thermostat in the event of overheating of triac 16. Switch 15 is a single-pole, double-throw relay switch controlled by relay winding 61. In the position shown in the drawing, switch 15 connects current primary winding 12, voltage primary winding 13 and fuse 14 in series across terminals L1 and L2. Switch 15 is in this position when the thermostat is "off". Switch 15 may be an electromechanical switch contained in a dielectric fluid filled enclosure whereby the fluid provides viscous damping to slow down the armature travel thereby reducing audible noise. The fluid also enhances heat dissipation and the dielectric characteristics of the switch 15.

Connected in parallel with switch 15 and voltage primary winding 13 is a semiconductor switching device in the form of a triac 16. The gate of the triac 16 is connected to a light responsive thyristor 17 which receives light from a light source (not shown) when the thermostat is to be switched to its "on" condition. Resistor 18 and capacitor 19 are connected in series across the thyristor 16 to suppress transients.

In the position of switch 15 shown in the drawing, the thermostat is "off" and both primary windings 12 and 13 are energized for magnetically driving secondary winding 21 of transformer 11. Because both primary windings are essentially connected in series across terminals L1 and L2, the current supplied to the load will be insufficient to significantly energize that load. When the thermostat switches to its "on" state, the contact of switch 15 transfers its position to open voltage primary winding 13 and connect current winding 12 in series with the load. Thus, current to the load is increased to a sufficient level to energize that load. At the same time, however, the current through current winding 12 causes secondary winding 21 to provide sufficient voltage to the electronics shown in the drawing to power the electronics during this "on" period of the thermostat. Triac 16 acts to suppress any arc which may otherwise be generated between the relay contacts of switch 15 when it is switched between positions. Thus, triac 16 conducts while the relay contacts are transferring.

Capacitor 71 is a reactive impedance in series with the transformer's voltage primary coil 13 to step down the line voltage without heat dissipation. Inductive coil 22 is connected in series with secondary winding 21 for limiting the voltage across the electronic circuitry under maximum load current conditions. The alternating current signal generated by secondary 21 is full wave rectified by full wave rectifier 23 and filtered by capacitor 24.

An electronic circuit arranged for low power consumption is supplied with a regulated voltage by a voltage regulator 25. Voltage regulator 25 includes an operational amplifier 26 having its positive input connected between resistor 27 and zener diode 28. Resistor 27 and zener diode 28 are connected in series and in parallel to capacitor 24. The output of the operational amplifier 26 is connected back to its negative input and is also used to supply voltage to bridge circuit 28A which senses changes in ambient temperature. Bridge circuit 28A comprises a first thermistor 29 which is exposed to ambient temperature and a second thermistor 30 which is internally mounted for sensing the internal heat generated by the electronic circuitry and relay 15 and 61 of the thermostat and is used to compensate the temperatre measuring circuit for self generated heat.

The output of operational amplifier 26 is connected to thermistor 29 through resistor 31 and setpoint potentiometer 32. A control arm of setpoint potentiometer 32 is connected to the positive input of operational amplifier 33 which acts as a signal amplifier. Connected in parallel to thermistor 29, resistor 31 and potentiometer 32 is a series circuit of resistor 34, resistor 35 and thermistor 30. The negative input terminal of amplifier 33 is connected to the junction of resistors 34 and 35. Negative feedback resistor 36 is connected between the output of operational amplifier 33 and its negative input. Any differences between the legs of bridge circuit 28A is then amplified by amplifier 33 and is supplied through resistor 37 to the positive input of amplifier 38. Resistor 39 is connected in parallel to thermistor 30 for limiting its effect.

Amplifier 38 acts as a voltage comparator comparing the output from resistor 37 at its positive input terminal to the voltage supplied by a voltage divider comprised of resistors 40 and 41 at its negative input terminal. Its output is connected through resistors 42 and 68 back to its positive input to provide positive feedback. Accordingly comparator 38 switches between its reference or ground potential and positive potential in response to the output of signal amplifier 33.

The output of amplifier 38 also is used to start a unijunction transistor circuit comprising unijunction transistor 43 and capacitor 44 for pulsing LE1 45 which is used as a status indicator, i.e., LED 45 will provide a visible indication when the setpoint temperature is above the sensed temperature. Thus, a thermostat user will see an immediate response to a change in setpoint.

The output of comparator 38 is also supplied to time delay circuit 50 which is comprised of an operational amplifier 51 having its positive input connected to resistor 42 through resistor 52. Capacitor 53 is also connected to the positive input of operational amplifier 51. The time delay is accomplished by charging and discharging capacitor 53 through resistors 42 and 52 from the output of comparator 38. The time delay prevents the switching relay 16 from being toggled at a greater rate than is permissible for the power rating of arc suppression triac 16.

The output from time delay amplifier 51 performs two main functions. First, it energizes transistor 54 for discharging the energy which had been stored in capacitor 55 during "off" periods of the thermostat through relay winding 61 to switch relay contacts 15. Consequently, when transistor 54 conducts, the switching relay is energized with a high energy pulse from capacitor 55, after which the power in the relay coil is considerably reduced. This reduction in the power supplied to relay coil 61 reduces the power dissipation of the relay resulting in reduced heat. Thus, the thermostat itself produces less heat than prior art line voltage thermostats which makes the thermostat less sensitive to sources of heat other than ambient temperature. Also, the thermostat, by use of thermistor 30, compensates for the small amount of heat which is generated by the thermostat. Consequently, the operation of the thermostat is more related to the ambient temperature.

The output of time delay circuit 50 also controls the energization of triac 16. Accordingly, when the thermostat switches on in response to a call for heat, the output of amplifier 51 goes "high" which drives "on" transistor 62 which allows capacitor 63 to discharge through transistor 62 and the bridge circuit 64 containing LED 65. In response to the electrical pulse supplied by capacitor 63, LED 67 supplies a light pulse to light responsive thyristor 17 for gating "on" triac 16 to short the contacts of relay 15 during the time that the contacts are transferring. At the same time, relay 61 is energized for transferring the contacts of relay 15. Because relay 61 is a slower device than triac 16, triac 16 will turn "on" prior to the transferring of the contacts and will be maintained "on" during the transferring. Thus, arcing across contacts 15 is avoided. When the thermostat is satisfied, the output from amplifier 51 goes "low" for deenergizing relay 61. At the same time, transistor 65 is turned "on" for discharging capacitor 66 through LED 67 to again turn on triac 16. Thus, when the relay contacts of relay 15 are transferring back to their original position, triac 16 will be "on" preventing any arcing across the relay contact.

Accordingly, it may be seen that there has been provided, in accordance with the present invention, an improved two wire line voltage thermostat.

The embodiments of the invention in which an exclusive property or right is claimed are defined as follows:

1. A two wire line voltage thermostat comprising
   first and second terminals for receiving line voltage power and for connection to a load;
   transformer means having current primary means, voltage primary means and secondary means;
   primary control means connecting said current and voltage primary means to said terminals, said primary control means having at leasst first and second states, said primary control means in said first state energizing both said current and voltage primary means and in said second state energizing only said current primary means; and
   temperature responsive means connected to said secondary means for controlling said primary control means between said first and second states in accordance with sensed temperature such that said load can be energized when said primary control means is in one of said states and can be deenergized when said primary control means is in one other one of said states, wherein said primary control means comprises a relay having a relay winding and relay contact means, said relay winding being energized and deenergized by said temperature response means, said relay contact means is response to said relay winding for energizing both said current and voltage primary means when said thermostat is in an off condition and for energizing only said current primary means when said thermostat is in an on condition, said primary control means further comprising an arc suppressing switch connected across said relay contact means for suppressing arcing of said relay contact means, and wherein said temperature responsive means comprises voltage regulation means connected to said secondary means for supplying regulated voltage and wherein temperature responsive means comprises a bridge circuit connected to the output of said regulation means and having a first thermistor responsive to ambient temperature and a second thermistor for compensating said bridge in response to heat generated by said thermostat.

2. The thermostat of claim 1 wherein said temperature responsive means comprises a comparator means connected to said bridge providing a first output usable in driving said primary control means to said first state in one condition of said bridge and a second output usable in driving said primary control means to said second state in response to a second condition of said bridge.

3. The thermostat of claim 2 wherein said temperature responsive means comprises time delay means connected to said comparator means for preventing operation of said relay at a rate above a predetermined amount.

4. The thermostat of claim 3 wherein said temperature responsive means comprises capacitive means responsive to said time delay means, said capacitive means comprising a capacitor for storing energy when said thermostat is off and for discharging through said relay winding when said thermostat is to switch from its off state to its on state, said relay winding receiving a lower hold-in current after discharge of said capacitor for reducing power dissipation in said relay winding.

5. The thermostat of claim 4 wherein said temperature responsive means comprises a triac gating circuit connected to said time delay means for gating on said arc suppression switch during transferring of said relay contacts.

6. The thermostat of claim 1 wherein said temperature responsive means comprises a bridge circuit connected by means to said secondary means and having a first thermistor responsive to ambient temperature and a second thermistor for compensating said bridge in response to heat generated by said thermostat.

7. The thermostat of claim 6 wherein said primary control means comprises a relay having a relay winding and a relay contact means, said relay winding being energized and deenergized by said temperature responsive means, said relay contact means in response to said relay windings for energizing both said current and voltage primary means when said thermostat is in an off condition and for energizing only said current primary means when said thermostat is in an on condition, said primary control means further comprising an arc suppressing switch connected across said relay contact means for suppressing arcing of said relay contact means.

8. The thermostat of claim 7 wherein said temperature responsive means comprises capacitive means responsive to said bridge circuit, said capacitive means comprising a capacitor for storing energy when said thermostat is off and for discharging through said relay winding when said thermostat is to switch from its off state to its on state, said relay winding re ceiving a lower hold in current after discharge of said capacitor for reducing power dissipation in said relay winding.

9. A two wire line voltage comprising
   first and second terminals for receiving line voltage power and for connection to a load;
   first and second supply means for supplying circuit energizing power;
   control means connecting said first and second supply means to said terminals, said control means having at least first and second states, said control means in said first state for energizing both said first and second supply means and in said second state for energizing only said first supply means; and
   temperature responsive means connected to said first and second supply means for receiving power from said first and second supply me ans when said control means is in said first state and for receiving power from only said first supply means when said control means is in said second state, said temperature responsive means being connected to said control means for controlling said control means between said first and second states in accordance with sensed temperature such that said load can be energized when said control means is in one of said states and can be deenergized when said control means is in the other of said states and wherein said temperature responsive means comprises a bridge circuit connected by means to said first and second supply means and having a first thermistor responsive to ambient temperature and a second thermistor for compensating said bridge in response to heat generated by said thermostat.

10. The thermostate of claim 9 wherein said control means comprises a relay having a relay winding and relay contact means, said relay winding being energized and deenergized by said temperature responsive means, said relay contact means in response to said relay winding for energizing both said first and second supply means when said thermostat is in an off condition and for energizing only said first supply means when said thermostat is in an on condition, said control means further comprising an arc suppressing switch connected across said relay contact means for suppressing arcing of said relay contact means.

11. The thermostat of claim 10 wherein said temperature responsive means comprises capacitive means responsive to said bridge circuit, said capacitive means comprising a capacitor for storing energy when said thermostat is off and for discharging through said relay winding when said thermostat is to switch from it off state to its on state, said relay winding receiving a lower hold-in current after discharge of said capacitor for reducing power dissipation in said relay winding.

12. The thermostat of claim 9 wherein said control means comprises a relay having a relay winding and relay contact means, said relay winding being energized and deenergized by said temperature responsive means, said relay contact means in response to said relay winding for energizing both said first and second supply means when said thermostat is in an off condition and for energizing only said first supply means when said thermostat is in an on condition.

13. The thermostat of claim 12 wherein said temperature responsive means comprises capacitive means, said capacitive means comprising a capacitor for storing energy when said thermostat is off and for discharging through said relay winding when said thermostat is to switch from its off state to its on state, said relay winding receiving a lower hold in current after discharge of said capacitor for reducing power dissipation in said relay winding 14. A line voltage thermostat comprising
first and second temrinals for receiving line voltage power and for connection to a load;
load control means having at least a first state for controlling energization of said load and a second state for controlling deenergiziation of said load and
temperature responsive means connected to said terminals and to said load controls means for controlling said load control means between said first and second states in accordance with sensed temperature, said temperature responsive means supplying a pull-in voltage to said load control means to operate said load control means to one of said states and for supplying a lower hold-in voltage to said load control means to maintain said load control means in said one of said states whereby said load control means generates less heat, wherein said load control means comprises a relay having a relay winding and a relay contact means, said relay winding being energized and deenergized by said temperature responsive means, said relay contact means in response to said relay winding for energizing and deenergizing said load and wherein said temperature responsive means comprises a bridge circuit having a first thermistor responsive to ambient temperature and a second thermistor for compensating said bridge in response to heat generated by said thermostat.

* * * * *